United States Patent [19]
Yamaguchi et al.

[11] Patent Number: 5,253,527
[45] Date of Patent: Oct. 19, 1993

[54] TORQUE BALANCER

[76] Inventors: Takao Yamaguchi, 1-22-19, Ooizumicho Nerimaku Tokyoto; Hajime Nishizawa, 4-28-3, Hongou Bunkyoku Tokyoto, both of Japan

[21] Appl. No.: 629,714

[22] Filed: Dec. 18, 1990

[30] Foreign Application Priority Data

Dec. 28, 1989 [JP] Japan .................................. 1-343475
Sep. 4, 1990 [JP] Japan .................................. 2-233700

[51] Int. Cl.⁵ ............................................. G01P 15/13
[52] U.S. Cl. .................................................. 73/517 B
[58] Field of Search ....................... 73/517 A, 517 B; 33/366; 318/648, 651

[56] References Cited
U.S. PATENT DOCUMENTS

| | | |
|---|---|---|
| 3,618,402 | 11/1971 | Kase ................................ 73/517 B |
| 4,088,027 | 5/1978 | Hernandez et al. ............. 73/517 B |
| 4,555,946 | 12/1985 | Capaldi et al. ................... 73/517 B |

Primary Examiner—John E. Chapman
Attorney, Agent, or Firm—Sandler Greenblum & Bernstein

[57] ABSTRACT

A torque balancer used in inclinometers, angular accelerometers or the like includes a magnet, a yoke, a movable coil, a weight, a relative declination detector and a feedback apparatus to hold the movable coil always in a reference position. The magnet is generally bar-shaped, and a magnetic field gap defined by a pole surface of the magnet and the opposed yoke is so defined that the size in the rotational direction of the movable coil is larger by a small amount than the size of the movable coil in its rotational direction. This small amount is selected to ensure that the movable coil does not fail to be located in the magnetic field gap even when it is moved to a maximum declined position detectable by the relative declination detector. A torsion band supporting the movable coil is fit on a pin extending in parallel orientation with a line connecting the pivotal center of the movable coil and the center of the weight.

2 Claims, 10 Drawing Sheets

TORQUE BALANCER

BACKGROUND OF THE INVENTION

1. Field of the Invention

This invention relates to a torque balancer used in, for instance, inclinometers, angular accelerometers or the like.

2. Description of the Prior Art

A conventional inclinometer using a torque balancer has the following construction. Specifically, an unbalanced weight is attached to a movable coil of a zero-balance ammeter, and a feedback current is fed to the movable coil in a direction for cancelling torque caused by the weight when the inclinometer is inclined. For this end, relative declination of the movable coil is detected and connected to an electrical signal by a relative declination detector, and the electrical signal, after amplified, is supplied to the movable coil as a negative feedback signal.

The conventional torque balancer, however, incurs a problem in that is not possible to obtain a feedback signal satisfying both a large balanceable torque range (large measurable inclination range in case of a inclinometer) and a high response speed. More specifically, the conventional torque balancer is configured to generate a balanced magnetic field corresponding to the operative range of an inclinometer either in a circuit with a magnet outside a coil or in a circuit with a magnet inside the coil. This results in a substantially uniform magnetic field which is widely and uniformly distributed over a relatively large movable range of the movable coil and hence results in a low magnetic flux density. As a result, sufficient feedback torque is not produced, the balanceable torque range is small, and the response speed is slow. Further, the entire apparatus is necessarily large-scaled in the attempt to obtain a large movable range of the movable coil.

OBJECTS AND SUMMARY OF THE INVENTION

It is therefore a first object of the invention to provide a torque balancer having a relatively high magnetic flux density to ensure sufficient feedback torque, a large balanceable torque range and a relatively high response speed.

A second object of the invention is to provide a torque balancer in which any vibration, impulse or the like, which may be incurred, does not cause deviation of the zero point.

The first object is attained by producing a concentrated magnetic field between a magnet and a yoke. Activation of a movable coil is always accomplished within the concentrated magnetic field. More specifically, the torque balancer according to the invention includes a magnet and a yoke both fixed to a frame to define a magnetic field gap midway of a closed magnetic circuit. A movable coil is located in the magnetic field gap defined by the magnet and the yoke, and supported for pivotal movement about an axis extending across the magnetic pole direction of the magnet. A weight is attached to the movable coil at a position spaced by a predetermined distance from the pivotal center of the movable coil. A relative declination detector for detecting declination of the movable coil from its reference position with respect to the magnet and the yoke is provided, and a feedback apparatus supplies the movable coil with a negative feedback of a declination signal detected by the relative declination detector to ensure the movable coil to be held in the reference position with respect to the magnet and the yoke, regardless of any torque, caused by force applied to the weight. The magnet is bar-shaped or generally bar-shaped. The size of the magnetic field gap in the rotating direction of the movable coil, which is defined by a pole surface of the magnet and the yoke opposed thereto, is larger by a small amount than the size of the movable coil in its rotational direction. The small amount is selected so that the movable coil does not fail to be located in the magnetic field gap, even when the movable coil is rotated to the maximum declined position detectable by the relative declination detector.

A magnetic field, with a relatively narrow width in the rotational direction of the movable coil, is produced in the magnetic field gap where the magnet and the yoke are opposed. The movable coil, in the reference position (zero-point position), is located in the center of the magnetic field gap. It is ensured that the movable coil never comes out of the magnetic gap between the magnet and the yoke, even in a situation where the relative declination detector detects the maximum measurable declination.

Therefore, the movable coil is always located in the concentrated magnetic field during a feedback operation, and relatively large torque is thus produced by the feedback current which flows therein. As a result, since torque balance is established even when large torque is caused by the weight (when the inclination is large in case of the use as an inclinometer), large torque (large inclination in case of the use as an inclinometer) can be measured. Additionally, the response property is improved, because of large feedback torque, even upon sudden or sharp variation in the torque (inclination). As a result, the torque balancer is adaptable for use as an inclinometer, even one which must be capable of detecting a large inclination and a large rate of change in speed of the inclination. Additionally, the torque balancer is also adaptable to an angular accelerometer for detecting an angular acceleration subject to a large rate of change in speed.

The second object of the invention is attained by orienting pins for torsion bands supporting the movable coil to coincide with the orientation of the weight, so as to ensure that movement of the movable coil, if any, does not substantially affect the zero point. The movable coil is supported by the torsion bands, in the form of narrow belt members, which are positioned in both sides of the movable coil and extend on opposite extensions of the pivotal center line. One end of each torsion band is coupled to a leaf spring to receive bending force therefrom, and the other end thereof is fixed to a band hook which is an integral part of the movable coil. The band hook has a pin extending in parallel orientation with a line connecting the pivotal center of the movable coil and the center of the weight. The torsion band is extended from the supported end by the leaf spring to the pin along the extension of the pivotal center line of the movable coil, then fit on the outer periphery of the pin, bent thereafter, and terminated at an end secured to the band hook.

When an impulse or shock is applied to the torque balancer, relative slide may occur between the torsion spring and the pin, which may cause the movable coil to be displaced from its original position. The displacement direction of the movable coil is parallel to the pin.

Since the pin is disposed in parallel orientation with the line connecting the center of the movable coil and the center of the weight, the movable coil changes its position only along the line connecting the center thereof and the center of the weight. As a result, and because the weight does not move in the pivotal direction of the coil, the impulse never affects the detected value of the relative declination detector. In other words, the zero point is never deviated. Therefore, the torque balancer is significantly resistant against vibration and impulse.

An arcuate portion, which behaves as a support member of the torsion band, may be formed in parallel orientation with the line connecting the center of the movable coil and the center of the weight, so that relative movement between the torsion band and the leaf spring, if any, does not affect the zero point.

Various other objects, advantages and features of the present invention will become readily apparent from the ensuing detailed description, and the novel features will be particularly pointed out in the appended claims.

DESCRIPTION OF THE PREFERRED EMBODIMENTS

Figure 1:
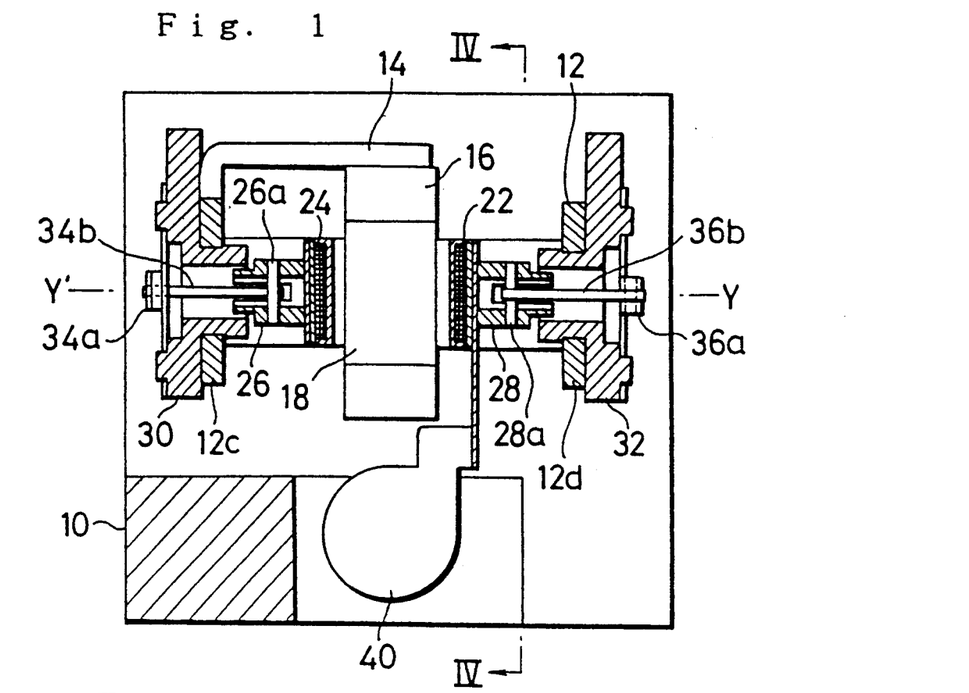
FIG. 1 is a cross-sectional view of a torque balancer shown as a first embodiment of the invention, taken along the I—I line of FIG. 2.
Figure 2:
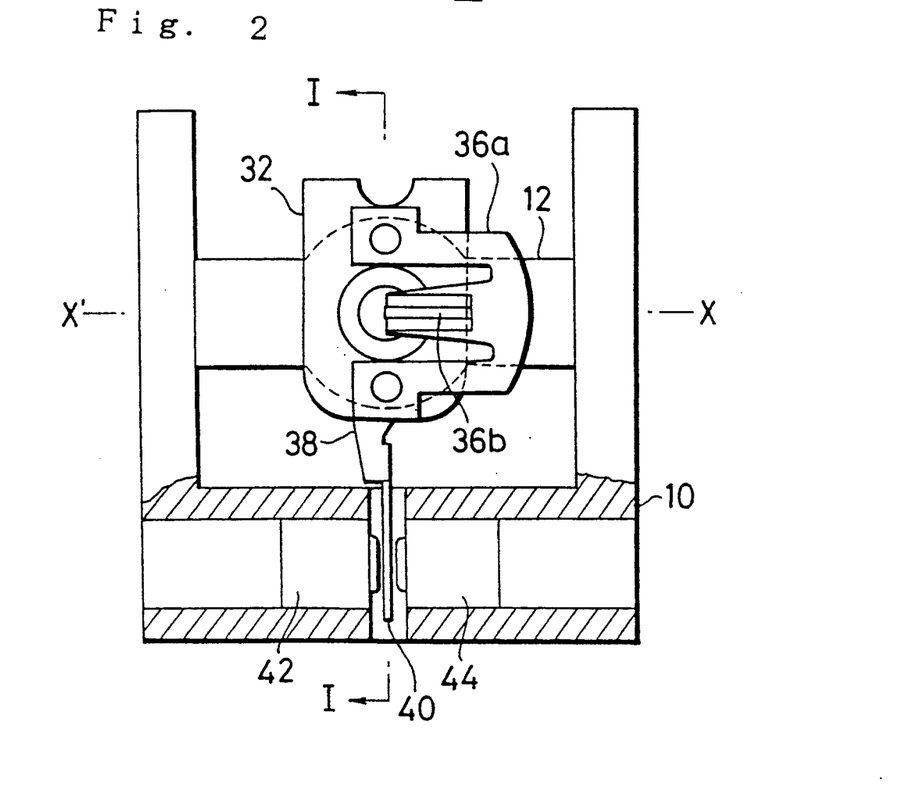
FIG. 2 is a partly cross-sectional side elevation of the torque balancer of FIG. 1.
Figure 3:
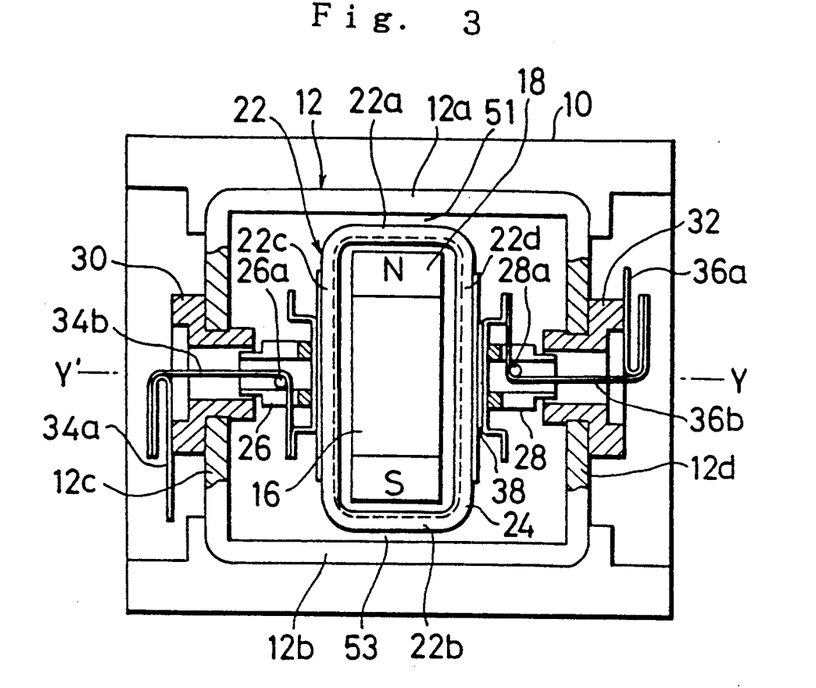
FIG. 3 is a partly cross-sectional plan view of the torque balancer of FIG. 1.
Figure 4:
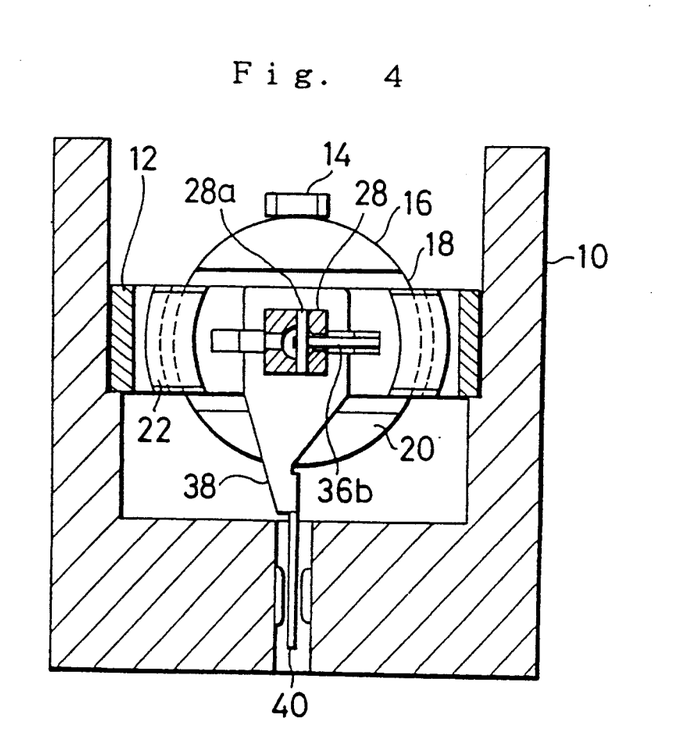
FIG. 4 is a cross-sectional view of the torque balancer of FIG. 1 taken along the IV—IV line of FIG. 1.
Figure 5:
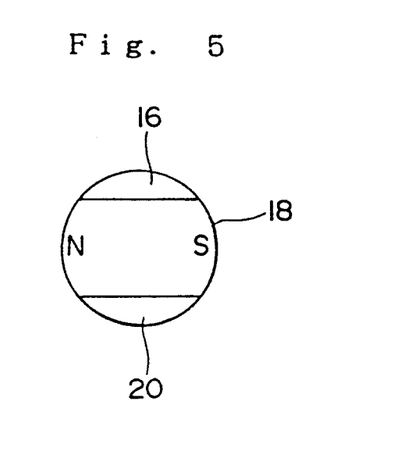
FIG. 5 is a front elevation of a magnet.
Figure 6:
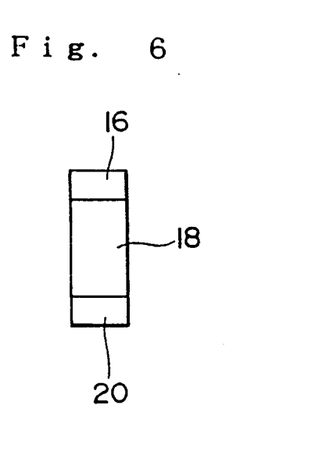
FIG. 6 is a side elevation of the magnet shown in FIG. 5.
Figure 7:
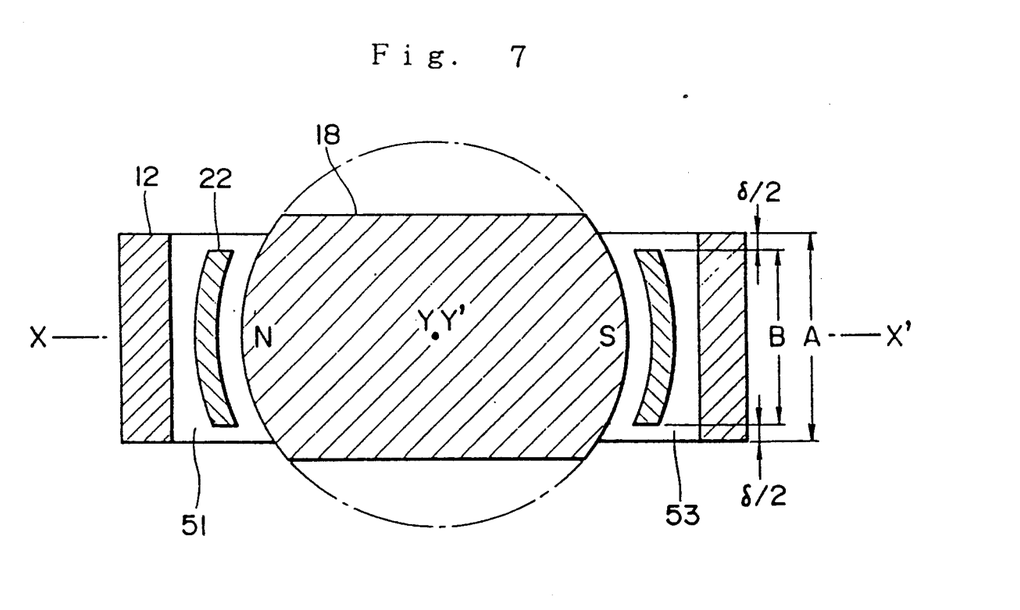
FIG. 7 is a diagram showing the positional relationship among a yoke, a magnet, and a movable coil.
Figure 8:
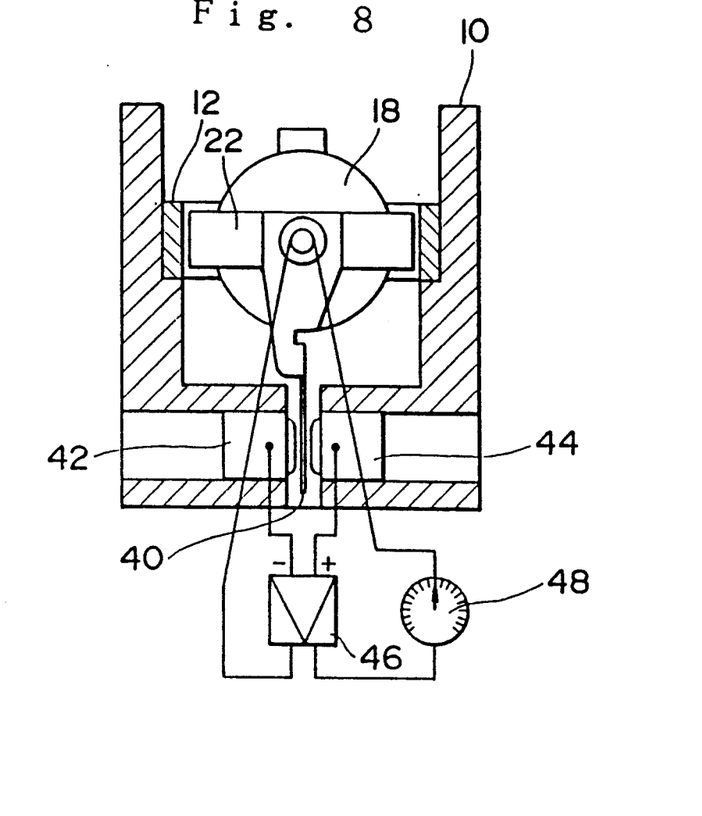
FIG. 8 is a diagram showing a feedback control system in the first embodiment.
Figure 10:
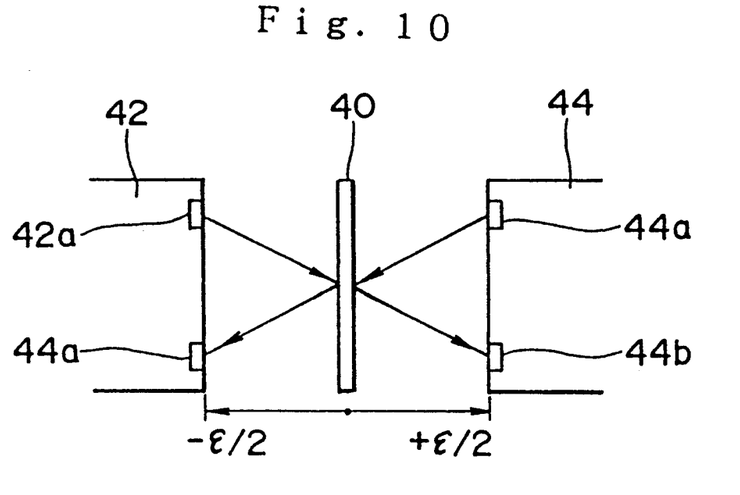
FIG. 10 is a diagram showing a status where a disk is located midway between photoelectric interrupters.
Figure 11:
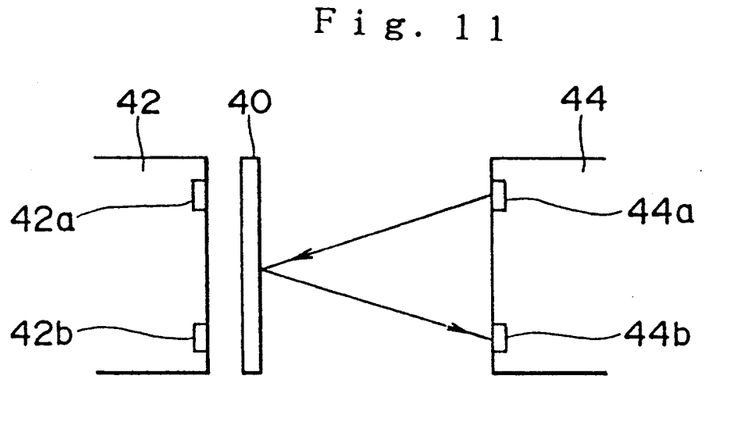
FIG. 11 is a diagram showing a status where the disk has moved closer to one of the photoelectric interrupters.
Figure 12:
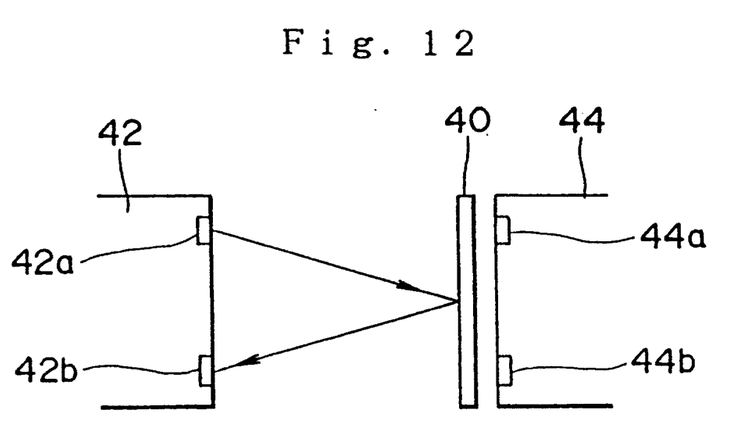
FIG. 12 is a diagram showing a status where the disk has moved closer to the other photoelectric interrupter.

As shown in FIGS. 1 to 4, a yoke 12 in the form of a generally rectangular, four-panelled integral member is secured to a frame 10 made of a non-magnetic material. The yoke 12 is provided with a stay 14 as unitary part thereof. The stay 14 extends in a horizontal direction from an upper end of the yoke 12 toward a central portion of the yoke 12. A generally bar-shaped magnet 18 is attached to the stay 14 via a non-magnetic metal member 16. The magnet 18, as shown in FIGS. 5 and 6, is made by bonding non-magnetic metal members 16 and 20 to opposite side surfaces of a bar-shaped magnet and by shaping the entirety into a cylindrical form. Therefore, right and left pole faces in FIG. 5 of the magnet 18 are arcuate. The magnet is placed so that its N pole and S pole are opposed to parallel surfaces 12a and 12b of the yoke 12, respectively. A movable coil 22 having a rectangular cross section is provided to encircle the outer periphery of the magnet 18. The movable coil 22 is composed by winding a wire on a coil frame 24. Short edges 22a and 22b of the elongated rectangular movable coil 22 are located in a magnetic field gap 51 between the parallel surface 12a of the yoke 12 and the N pole of the magnet 18 and in a magnetic field gap 53 between the parallel surface 12b and the S pole, respectively. Cross sections of the short edges 22a and 22b in the upper to lower direction in FIG. 1 are arcuate, as shown in FIG. 7, to meet the arcuate configuration of the magnet 18. As a result, the relative relationship between the movable coil 22 and the magnet 18 is not changed by relative pivotal movement, if any, therebetween. Band hooks 26 and 28 are respectively bonded to central portions of long edges 22c and 22d of the movable coil 22. On the other hand, hollow bush-shaped span bobbins 30 and 32 are fixed to central portions of parallel surfaces 12c and 12d which intersect the parallel surfaces 12a and 12b of the yoke 12, respectively. Torsion bands 34b and 36b are respectively attached to the span bobbins 30 and 32 and connected to the band hooks 26 and 28. More specifically, the torsion band 36b is fit on the central arcuate turn at the central folded-back portion of the leaf spring 36a fixed to the span bobbin 32, bent thereafter, and terminates at a soldered distal end thereof. The other part of the torsion band 36b is fit on a pin 28a secured to the band hook 28, bent thereafter, and terminates at an end soldered to the band hook 28. The pin 28a is disposed in vertical orientation in FIG. 1, i.e., in parallel orientation with a line connecting the center of the movable coil (Y—Y' axis) and the center of a disk which will be referred to later. The leaf spring 36a exerts bending force to the torsion band 36b. Essentially the same arrangement is applied to the leaf spring 34a, torsion band 34b and pin 26a of the band hook placed on the same axis (Y—Y' axis). As a result, the movable coil 22 is supported for pivotal movement about the Y—Y' axis. Since no friction occurs between span bands 34 and 36, the horizontal surface including the center of the movable coil 22 is located in a common surface to the horizontal surface including the center of the yoke 12. A relationship among the magnet 18, the movable coil 22 and the yoke 12 in such case, with the movable coil 22 located in the reference position, is shown in FIG. 7. Dimension A of the yoke 12 is larger by a small amount δ than dimension B of the movable coil 22. A current can be supplied to the movable coil from the exterior. An arm 38 is attached to the movable coil 22, and supports a disk 40 at its distal end. The weight of the disk 40 is used as an a unbalance weight to give the movable coil 22 gravitationally induced torque upon inclination. The disk 40 is also used as a reflecting plate for photoelectric interrupters 42 and 44 which are opposed to and spaced from opposite surfaces thereof by a small gap as shown in FIG. 2. The photoelectric interrupters 42 and 44, described later in greater detail, include light emitters 42a and 44a and light receptors 42b and 44b (see FIGS. 10 to 12), and issue voltages responsive to the amounts of light received. The photoelectric interrupters 42 and 44, as shown in FIG. 8, are coupled to a differential amplifier 46 whose output is coupled to the movable coil 22. Provided midway of the circuit is an indicator 48 for indicating an output of the differential amplifier 46.

Figure 9:
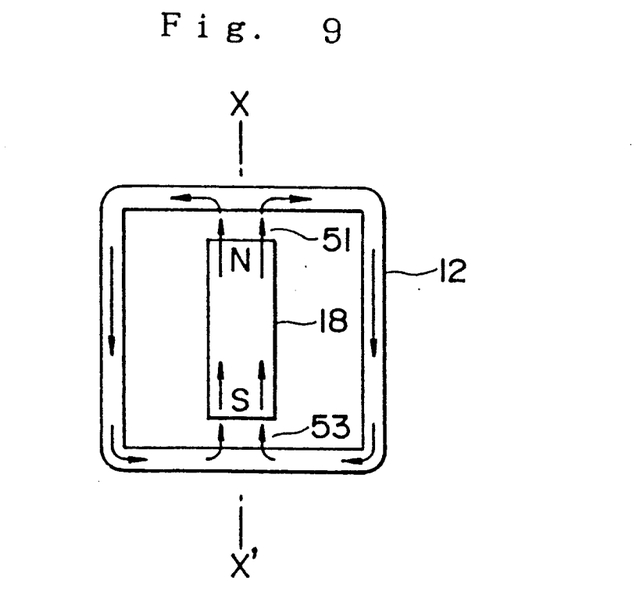
FIG. 9 is a diagram showing a magnetic path formed by the magnet.
Figure 13:
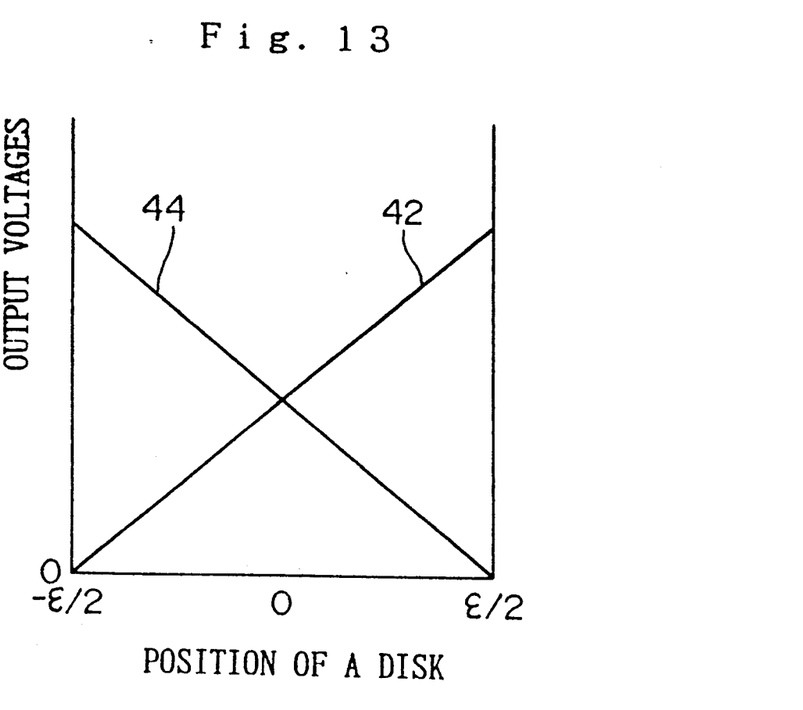
FIG. 13 is a diagram showing output voltages of the photoelectric interrupters.
Figure 14:
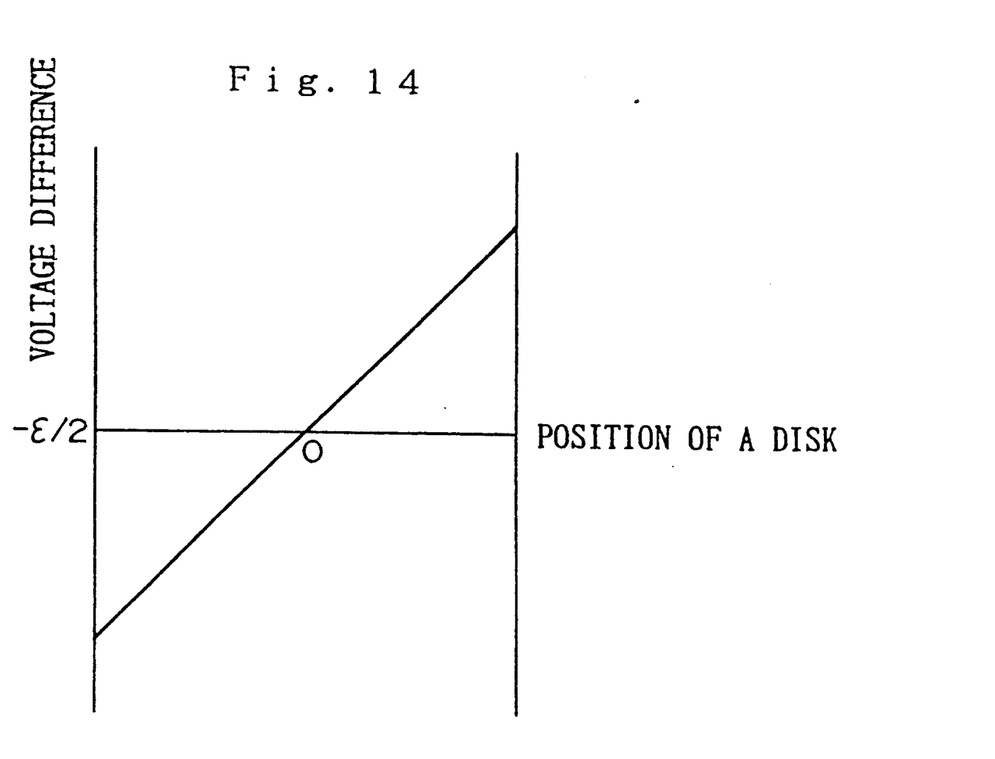
FIG. 14 is a diagram showing an output indicative of the voltage difference between the photoelectric interrupters.

Next explanation is directed to an operation of the foregoing embodiment. The 18 forms, a closed circuit as shown in FIG. 9. In the case where the yoke 12 is in the form of a soft-iron member which is 14 mm long in each edge, 5 mm wide and 1 mm thick, and the magnet 18 has a square cross section of 5 mm×5 mm and 9 mm long, the magnetic flux density is 9 KG in the interior of the yoke 12, and 3 KG in magnetic field gaps 51 and 53. Since the magnetic circuit forms a closed loop which is less subject to magnetic flux leakage than an open loop, the aforementioned high magnetic flux density is obtained in the magnetic field gaps 51 and 53. When the frame 10 is installed in a condition with no inclination from the gravity direction, no torque is caused by the weight of the disk 40, and the movable coil 22 is located in the reference position (declination is 0). In this status, the disk 40 is located in the middle position between the photoelectric interrupters 42 and 44, and, with no difference between output voltages of the photoelectric interrupters 42 and 44, the indicator 48 indicates 0. More specifically, when the disk 40 is located in the middle position between the photoelectric interrupter 42 and the photoelectric interrupter 44, no difference is present between the amount of light emitted from the emitter 42a of the photoelectric interrupter 42, which is then reflected by the disk 40 and received by the receptor 42b, compared to the amount of light emitted from the emitter. 44b of the photoelectric interrupter 44, which is then reflected by the disk 40 and received by the receptor 44b. Therefore, with no difference between the photoelectric interrupters 42 and 44, the output of the differential amplifier 46 is essentially 0. When the disk 40 is deviated closer to the photoelectric interrupter 42 (FIG. 11) or the photoelectric interrupter 44 (FIG. 12), the amount of light received on the side of the disk 40 which is closer to an emitter is decreased. As a result, outputs of the photoelectric interrupters 42 and 44 are as shown in FIG. 13, and the difference between these outputs is as shown in FIG. 14.

When the frame 10 inclines in the plane shown in FIG. 2, the system operates as follows. Even with inclination of the frame 10, the movable coil 22, supported thereto for relative pivotal movement, is rotated by the gravity acting on the weight of the disk 40, so as to maintain its orientation, with its arm extending vertically. Therefore, depending on the inclined direction of the frame 10, one of the photoelectric interrupters 42 and 44 becomes closer to the disk 40, and the other becomes further away from the disk 40. When the disk 40 is deviated the middle position between the photoelectric interrupters 42 and 44, a voltage difference is entered in the differential amplifier 46 according to the characteristic as shown in FIG. 14. The differential amplifier 46, in response to the voltage difference, performs feedback control to remove the difference. More specifically, the differential amplifier 46 feeds the movable coil 22 with a current of predetermined direction and value depending on the plus or minus sign of the voltage difference. With a current flowing therein, the movable coil 22 is pivoted so as to locate the disk 40 in the middle position between the photoelectric interrupters 42 and 44. The feedback control is carried out continuously, and the disk 40 is held in the middle position between the photoelectric interrupters 42 and 44, regardless of any inclination of the frame 10. In this case, the larger the inclination of the frame 10, the larger the torque of the movable coil 22 caused by the gravity acting on the weight of the disk 40. This results in a larger amount of current fed to the movable coil 22 to maintain the same inclination of the movable coil 22 as that of the frame 10. This value of the current is detected by the indicator 48. Therefore, the current value indicated by the indicator 48 corresponds to the inclination of the frame 10. In this fashion, measurement of inclination is performed.

The above-described operation is explained below, using numerical equations. When representing the magnetic flux density of the magnetic field gaps 51 and 53 by $B_g$, and representing the current flowing in the movable coil by i, the torque $T_e$ is expressed by:

$$T_e = K_1 \cdot B \cdot \quad (1)$$

where $K_1$ is a constant determined by the number of turns of the movable coil 22 and the dimension of the coil frame 24. Since $B_g$ may be regarded to be constant, the torque $T_e$ is proportional to i.

Figure 15:
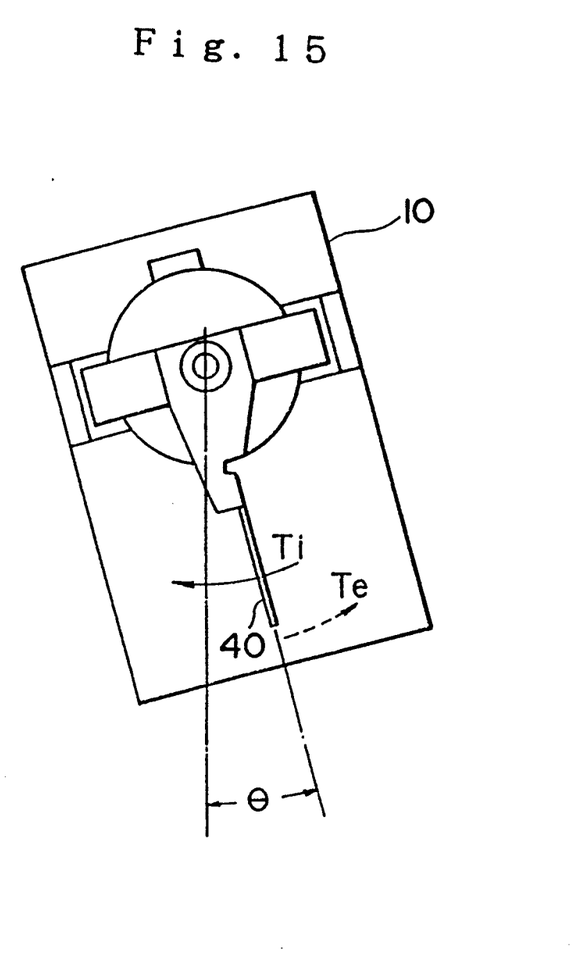
FIG. 15 is a diagram showing a status where the torque balancer is inclined.

When the frame 10 inclines by angle 0 as shown in FIG. 15, pendulum torque $T_1$ expressed by the following equation acts on the movable coil 22.

$$T_i = K_2 \cdot \sin\theta \quad (2)$$

where $K_2$ is a constant determined by the weight of the equivalent center point of the weight of the disk 40 and the pendulum length.

Figure 16:
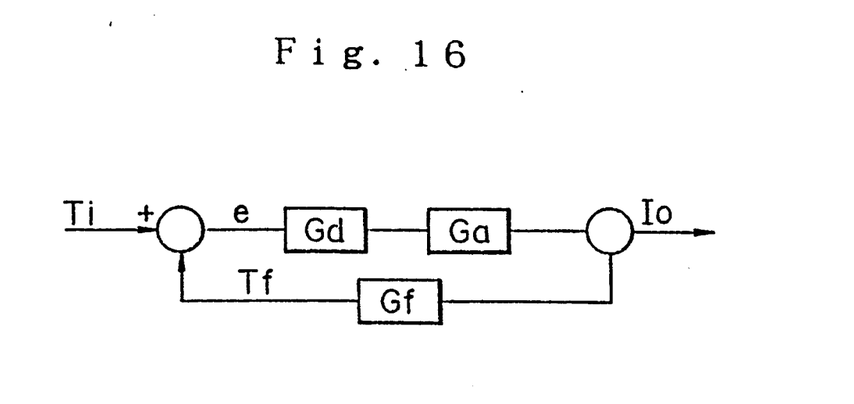
FIG. 16 is a block diagram of the feedback system.

The feedback system of the apparatus is shown in a block diagram in FIG. 16 where $T_i$ is input torque caused by inclination of the movable coil, $T_f$ is feedback torque caused by a current negatively fed back to the movable coil 22, e is the difference between $T_i$ and $T_f$, $G_d$ is the transfer function of the detector portion, $G_a$ is the gain of the amplifier circuit, $I_o$ is the output current, and $G_f$ is the gain of the feedback circuit. Following equations are established among them:

$$e = T_i - T_f$$

$$T_f = I_o \times G_f$$

$$I_o = G_d \times G_a \times e$$

When it is assumed that:

$$G_d \times G_a = G_t$$

it results in:

$$I_o/T_i = G_t/(1 + G_f G_t)$$

When it is assumed that $G_t \gg 1$, it results in:

$$I_o/T_i = 1/G_f \qquad (3)$$

When incorporating $T_e = T_i$ and $i = I_o$ in equation (1), $G_f$ is obtained as follows:

$$G_f = K_1 \times B_g$$

When incorporating this $G_f$ in equations (2) and (3), it results in:

$$I_o = (K_2 \times \sin\theta)/(K_1 \times B_g)$$

When assuming that:

$$K_2/K_1 = K$$

it results in:

$$I_o = K \times \sin\theta / B_g \qquad (4)$$

In this case, $B_g$ may be considered to be constant, a current proportional to the sine value of the inclination is obtained. It is further noted that the larger the magnetic flux density $B_g$, the larger the inclination range $\theta$.

Figure 17:
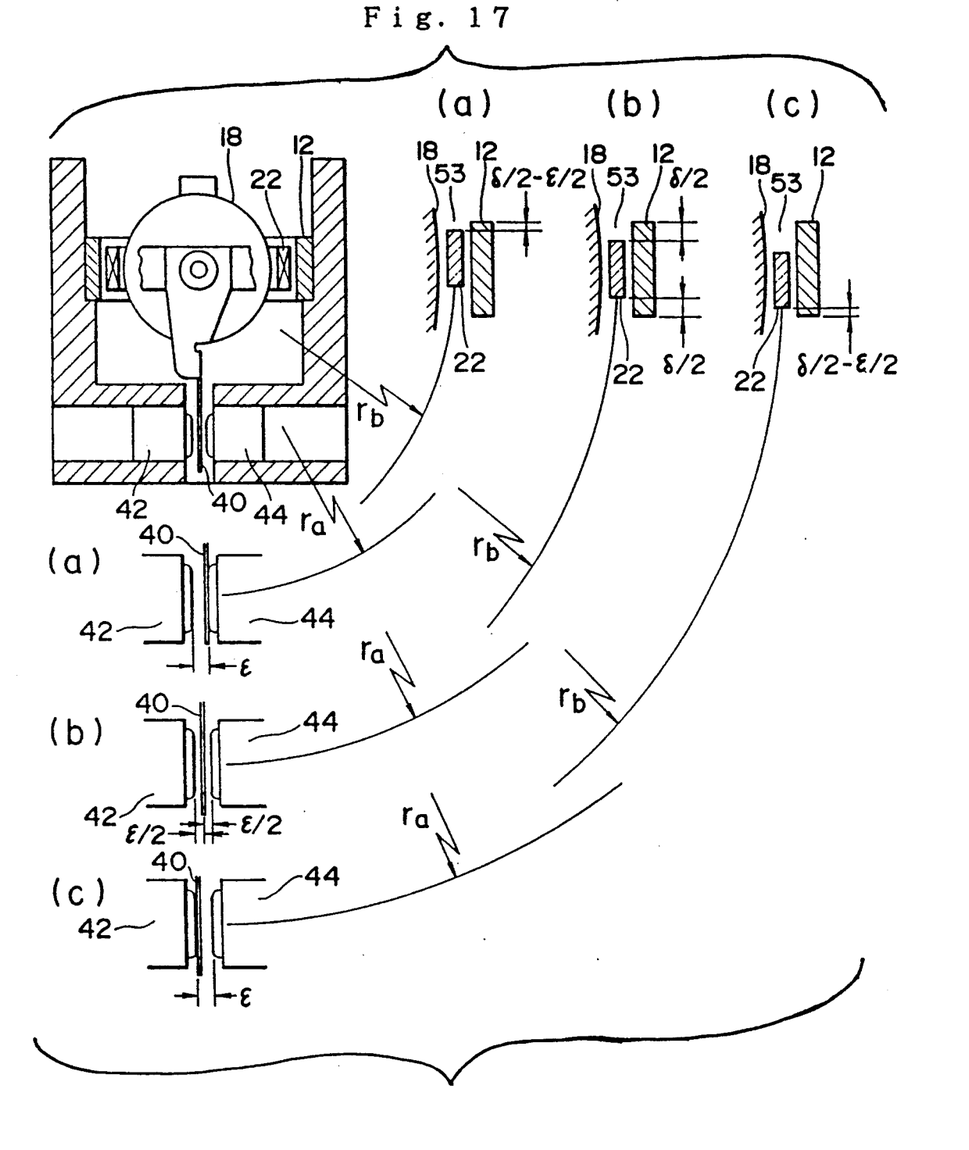
FIG. 17 is a diagram showing relationships between movable ranges of the disk and locations of the movable coil.

As shown in FIG. 7, B dimension of the movable coil 22 is smaller than A dimension of the yoke 12 by the small amount δ, and the movable coil 22 is located in the concentrated magnetic field generated by the magnet 18. This status is shown in FIG. 17. Since the movable coil 22 and the disk 40 are present on the same rotational member, they are equal in rotational angle, although different in rotational radius (radius $r_a$ for the disk 40 and radius $r_b$ for the movable coil 22) and hence sweep out different areas when moved. In FIG. 17, (b) shows the status where they are in the center position (reference position) whereas (a) and (c) show the status where they are in $+\epsilon/2$ and $-\epsilon/2$ deviated positions, respectively, from the reference position. Also in the status (a) where the disk 40 has moved closest to the photoelectric interrupter 44, the movable coil 22 is located in the magnetic field gaps 51 and 53 and does not get out of the concentrated magnetic field. Also in the contrary status (c) where the disk 40 has moved closest to the photoelectric interrupter 42, the movable coil 22 is located in the magnetic field gaps 51 and 53. It is therefore noted that the movable coil 22, in either case, is not ever located outside of the magnetic field gaps 51 and 53. The moveable coil 22 is always with the magnetic field gaps 51 and 53, with an allowance expressed by:

$$|1\delta/2 - (\epsilon/2) \times (r_a/r_b)|$$

Actual values of the foregoing respective values are: $\epsilon = 0.5$ mm, $\delta = 2$ mm, $r_a = 10$ mm, and $r_b = 5.75$ mm, and the movable coil 22 has an allowance in the amount of 0.56 mm in each direction from the reference position. Thus the movable coil 22 is located in the relatively narrow magnetic field gaps 51 and 53, and the magnetic flux passing through the movable coil, 22 represents a high density, which results in a relatively large feedback torque obtained by feeding a current to the movable coil 22. Therefore, even under a large inclination of the frame 10, the disk 40 can be held in the middle position between the photoelectric interrupters 42 and 44. This means that the measurable maximum inclination angle is increased. As described above, when the yoke is a soft-iron member which is 14 mm long in each edge, 5 mm wide and 1 mm thick, and the magnet 18 is a member having a square cross section of 5 mm × 5 mm and 9 mm long, the magnetic flux density passing through the movable coil 22 represents 3 KG, and measurement up to 90 degrees inclination is possible. The response speed is also increased, (reaches 70 Hz), and measurement of sharply variable inclination is also possible. Additionally, the measurement accuracy is increased to 0.01% (±5 minutes) in the range of ±90 degrees. Further, the scale of the apparatus is decreased so much as to permit the entire apparatus to be contained in a 25 mm cubic casing.

In the torque balancer, the zero point is never changed, even when an impulse is applied thereto. When an impulse is applied, the movable coil 22, supported by the torsion bands 34b and 36b may be moved. However, since the movable coil 22 is supported by the torsion bands 34b and 36b which fit around and frictionally engage with the pins 26a and 28a of the band hooks 26 and 28, the movable coil 22 cannot move except in the axial directions of the 28a and 28a. Therefore, possible displacement of pins 26a and the movable coil 22 is limited to the up and down direction in FIGS. 1 and 2. As better shown in FIG. 2, up and down movement, if any, of the movable coil 22 does not cause positional changes of the disk 40 toward the photoelectric interrupter 42 or 44. In other words, the disk 40 is reliably held in the middle position between the photoelectric interrupters 42 and 44 unless external force is applied. Therefore, an impulse, if any, never causes deviation of the zero point. Also referring to the supporting structure on the part of the leaf springs 34a and 36a of the torsion bands 34b and 36b, since the arcuate bent portions are parallel to the pins 26a and 28a, the movable coil 22, here again, cannot move except in the up and down direction. Therefore, the torque balancer is not subject to deviation in the zero point even when an impulse is applied.

Figure 18:
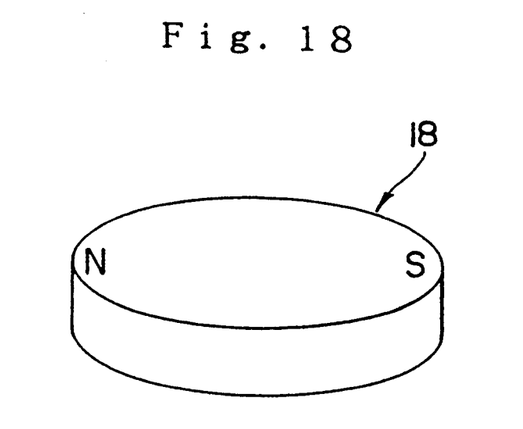
FIG. 18 is a diagram showing a cylindrical magnet.
Figure 19:
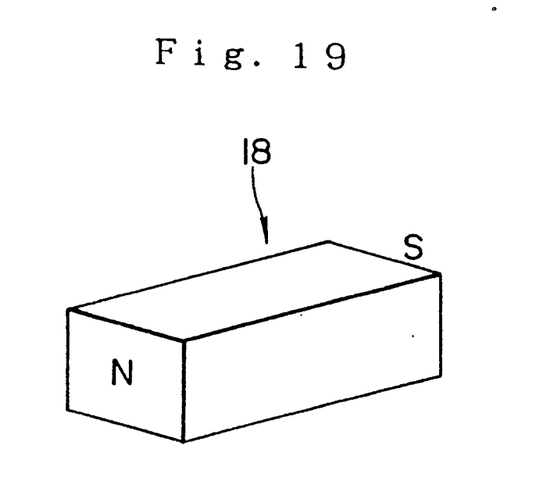
FIG. 19 is a diagram showing a rectangular magnet.

The foregoing embodiment uses the round-shaped magnet 18 composed of non-magnetic metal members 16 and 20 bonded together as shown in FIGS. 5 and 6. However, as shown in FIG. 18, it may be a cylindrical magnet magnetized in the radial direction. This contributes to a decrease in the number of parts and elements, and a simplified construction. The magnet may be a bar magnet in the form of a rectangular solid having a square cross section as shown in FIG. 19.

Figure 20:
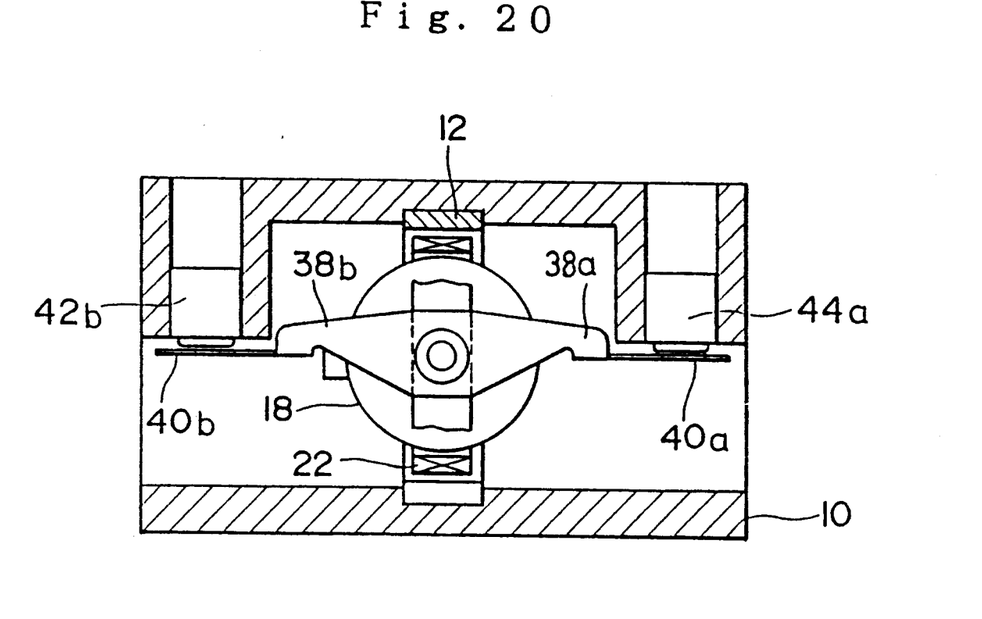
FIG. 20 is a plan view of an angular accelerometer taken as a second embodiment.
Figure 21:
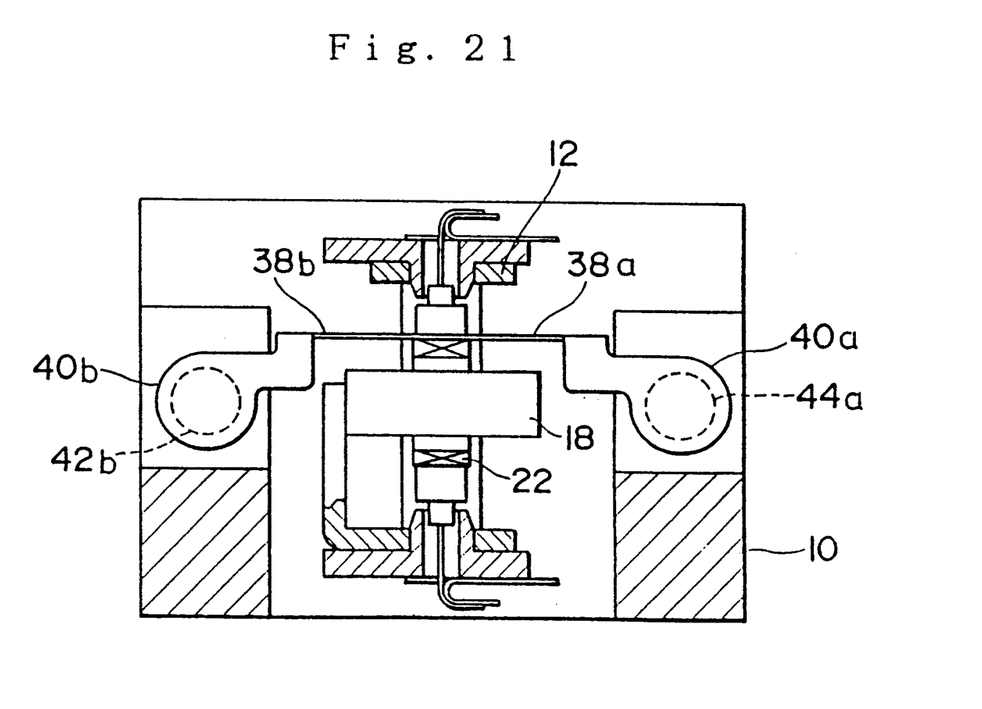
FIG. 21 is a front cross-sectional view of the angular accelerometer of FIG. 20.

FIGS. 20 and 21 show a further embodiment in which the torque balancer according to the invention is incorporated in an angular accelerometer. The movable coil 22 is supported for pivotal movement with its axis extending in vertical orientation. Two arms 38a and 38b, of the movable coil 22, support disks 40a and 40b which are disposed in symmetrical positions with respect to the axis of the movable coil 22. The weight of the disks 40a and 40b behaves as an additional balance weight of the movable arrangement to increase the inertia moment thereof. Photoelectric interrupters 42a.42b and 44a.44b are opposed to and slightly spaced from the disks 40a and 40b, respectively. Since the remainder of the essential construction of the angular accelerometer is substantially the same as the first embodiment, members or elements corresponding to those of the first embodiment are denoted by the same reference numerals. The differential amplifier 46, not shown, is also the same as the first embodiment.

In the embodiment of FIGS. 20 and 21, when rotational angular acceleration is applied to the frame 10, an inertia moment of the movable arrangement increased by inclusion of the balance weight of the right and left disks 40a and 40b tends to cause relative rotation of the movable coil 22 with respect to the frame 10. Also in this case, however, similarly to the embodiment of FIG. 1, a feedback current is fed to the movable coil 22 to hold it in the balanced position shown in FIGS. 20 and 21. As a result, a value indicative of the applied angular acceleration is indicated by the indicator 48. Also in this embodiment, by forming the pins of the band hooks in parallel orientation with the line connecting the pivotal center of the movable coil and the center of the weight, it is ensured that displacement of the movable coil, if any, does not cause deviation of the zero point, as in the first embodiment.

While the present invention has been particularly shown and described with respect to certain preferred embodiments thereof, it will be readily apparent to one of ordinary skill in the art that various changes and modifications in form and details can be made without departing from the spirit and scope of the invention. For example, although the two embodiments discussed have been described as using a photoelectric detector in the form of a variable distance type interrupter to detect declination of the movable coil 22, a photoelectric detector of a constant-gap, variable relative-movement type may be used. Alternatively, a detector of a variable distance type or a constant-gap, variable relative-movement type in the form of combination of a high-frequency pickup and an aluminum plate, combination of two capacitor plates, etc. may also be used.

What is claimed is:

1. A torque balancer comprising: a magnet and a yoke fixed to a frame to define a magnetic field gap midway of a closed magnetic circuit; a movable coil located in said magnetic field gap defined by said magnet and said yoke and supported for pivotal movement about a pivotal center line extending across the magnetic pole direction of said magnet; a weight attached to said movable coil in a position distant from the pivotal center thereof by a predetermined distance; a relative declination detector for detecting declination of said movable coil from a reference position thereof with respect to said magnet and said yoke; and a feedback apparatus for supplying said movable coil with a negative feedback of a declination signal detected by said relative declination detector to hold said movable coil in said reference position regardless any possible torque caused by force applied to said weight, said movable coil being supported by elongated torsion bands extending on opposite sides thereof on extensions of said pivotal center line, each said torsion band having one end coupled to and biased by a leaf spring and having the other end fixed to a band hook formed as unitary part of said movable coil, said band hook including a pin extending in parallel orientation with a line connecting the pivotal center of said movable coil and the center of said weight, said torsion band extending from said one end connected to said leaf spring along said pivotal center line of said movable coil, then fit on the outer periphery of said pin, bent thereafter, and terminating at the other end fixed to said band hook.

2. The torque balancer according to claim 1 wherein said torsion band is fit on an arcuate portion of said leaf spring and bent therealong, and the bent distal end is fixed to said leaf spring, said arcuate portion being disposed in parallel to said pin.

* * * * *